US012640527B2

(12) United States Patent
Casher et al.

(10) Patent No.: US 12,640,527 B2
(45) Date of Patent: May 26, 2026

(54) CONTACT ASSEMBLY AND METHOD OF MAKING SAME AND ELECTRICAL CONNECTOR INCLUDING THE CONTACT ASSEMBLY

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventors: Patrick R. Casher, North Aurora, IL (US); Terrance F. Little, Fullerton, CA (US)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 300 days.

(21) Appl. No.: 18/477,057

(22) Filed: Sep. 28, 2023

(65) Prior Publication Data

US 2024/0113483 A1 Apr. 4, 2024

Related U.S. Application Data

(60) Provisional application No. 63/377,859, filed on Sep. 30, 2022.

(51) Int. Cl.

| | |
|---|---|
| ***H01R 24/60*** | (2011.01) |
| ***H01R 13/405*** | (2006.01) |
| ***H01R 13/6471*** | (2011.01) |
| ***H01R 43/24*** | (2006.01) |

(52) U.S. Cl.
CPC ........... *H01R 24/60* (2013.01); *H01R 13/405* (2013.01); *H01R 13/6471* (2013.01); *H01R 43/24* (2013.01)

(58) Field of Classification Search
CPC .................................................. H01R 13/6471
See application file for complete search history.

(56) References Cited

U.S. PATENT DOCUMENTS

| | | | | |
|---|---|---|---|---|
| 7,163,421 | B1 * | 1/2007 | Cohen | H01R 12/727 439/607.02 |
| 8,177,564 | B1 | 5/2012 | Ito et al. | |
| 8,764,460 | B2 | 7/2014 | Smink et al. | |
| 8,764,464 | B2 | 7/2014 | Buck et al. | |
| 8,814,595 | B2 * | 8/2014 | Cohen | H01R 13/6473 439/701 |
| 9,455,530 | B2 | 9/2016 | Patel | |

(Continued)

FOREIGN PATENT DOCUMENTS

| | | |
|---|---|---|
| CN | 204760581 U | 11/2015 |
| CN | 105490094 A | 4/2016 |

*Primary Examiner* — Neil Abrams
(74) *Attorney, Agent, or Firm* — Ming Chieh Chang

(57) ABSTRACT

A contact assembly for an electrical connector includes: a ground contact module including plural ground contacts defining an engaging section exposed to air and a conductive plastic member mounted to the engaging section and extending through each of the plural ground contacts; plural pairs of signal contacts alternately arranged between the plural ground contacts; and an insulative member mounted to the plural pairs of signal contacts and at least some of the plural ground contacts.

9 Claims, 5 Drawing Sheets

(56) References Cited

U.S. PATENT DOCUMENTS

| | | | |
|---|---|---|---|
| 9,692,183 | B2 | 6/2017 | Phillips et al. |
| 9,768,557 | B2 | 9/2017 | Phillips et al. |
| 10,367,308 | B2 | 7/2019 | Little et al. |
| 10,396,513 | B2 | 8/2019 | Regnier |
| 11,322,869 | B2 | 5/2022 | Phillips et al. |
| 12,362,514 | B2 * | 7/2025 | Si ........................ H01R 13/6474 |
| 2014/0127946 | A1 | 5/2014 | Ito et al. |
| 2021/0328384 | A1 | 10/2021 | Avery et al. |
| 2021/0336360 | A1 | 10/2021 | Kolak et al. |
| 2022/0021158 | A1 | 1/2022 | Little et al. |
| 2022/0216635 | A1 | 7/2022 | Little et al. |
| 2022/0352675 | A1 | 11/2022 | Zerebilov et al. |

* cited by examiner

CONTACT ASSEMBLY AND METHOD OF MAKING SAME AND ELECTRICAL CONNECTOR INCLUDING THE CONTACT ASSEMBLY

CROSS REFERENCE TO RELATED APPLICATION

This application claims priority to and benefit of U.S. Provisional Patent Application No. 63/377,859, filed Sep. 30, 2022.

BACKGROUND OF THE INVENTION

Field of the Invention

The present invention relates to a contact assembly for an electrical connector, and method of making the same, and an electrical connector including the contact assembly, the contact assembly comprising a ground contact module including a plurality of ground contacts and a conductive plastic member mounted to the plurality of ground contacts; plural pairs of signal contacts alternately arranged between the plurality of ground contacts; and an insulative member mounted to the signal contacts and the ground contacts.

Description of Related Arts

U.S. Pat. No. 9,768,557 discloses an electrical connector in which, during manufacture, signal and ground contacts may be stamped and formed contacts defining leadframes. The leadframes arrange the contacts in an array, and carrier strips of the leadframe may be removed after stamping and forming to define a contact array. The leadframes are overmolded to form overmold bodies. Optionally, the leadframes may be overmolded in a multi-stage molding process where main bodies are molded in a first stage and lossy ground absorbers (e.g., conductive plastic members) are molded in a second stage, or vice versa. The lossy ground absorbers may be co-molded with the main bodies in a multi-shot molding process, such as a two-shot molding process, where the main bodies and the lossy ground absorbers are molded from different materials, such as a low loss plastic material and a lossy material, respectively.

SUMMARY OF THE INVENTION

A contact assembly for an electrical connector comprises: a ground contact module including a plurality of ground contacts defining an engaging section exposed to air and a conductive plastic member mounted to the engaging section and extending through each of the plurality of ground contacts; plural pairs of signal contacts alternately arranged between the plurality of ground contacts; and an insulative member mounted to the plural pairs of signal contacts and at least some of the plurality of ground contacts.

A method of making a contact assembly comprises the steps of: mounting an electrically lossy member to an engaging section of a plurality of ground contacts to expose the engaging section to air and to extend through each of the plurality of ground contacts to form a ground contact module; arranging plural pairs of signal contacts alternately between the plurality of ground contacts; and molding an insulative member to the plural pairs of signal contacts and at least some of the plurality of ground contacts.

An electrical connector comprises an insulative housing and a contact assembly received in the insulative housing, the contact assembly including: a ground contact module including a plurality of ground contacts defining an engaging section exposed to air and an electrically lossy member mounted to the engaging section and extending through each of the plurality of ground contacts; plural pairs of signal contacts alternately arranged between the plurality of ground contacts; and an insulative member mounted to the plural pairs of signal contacts and at least some of the plurality of ground contacts.

DETAILED DESCRIPTION OF THE DRAWINGS

Figure 1:
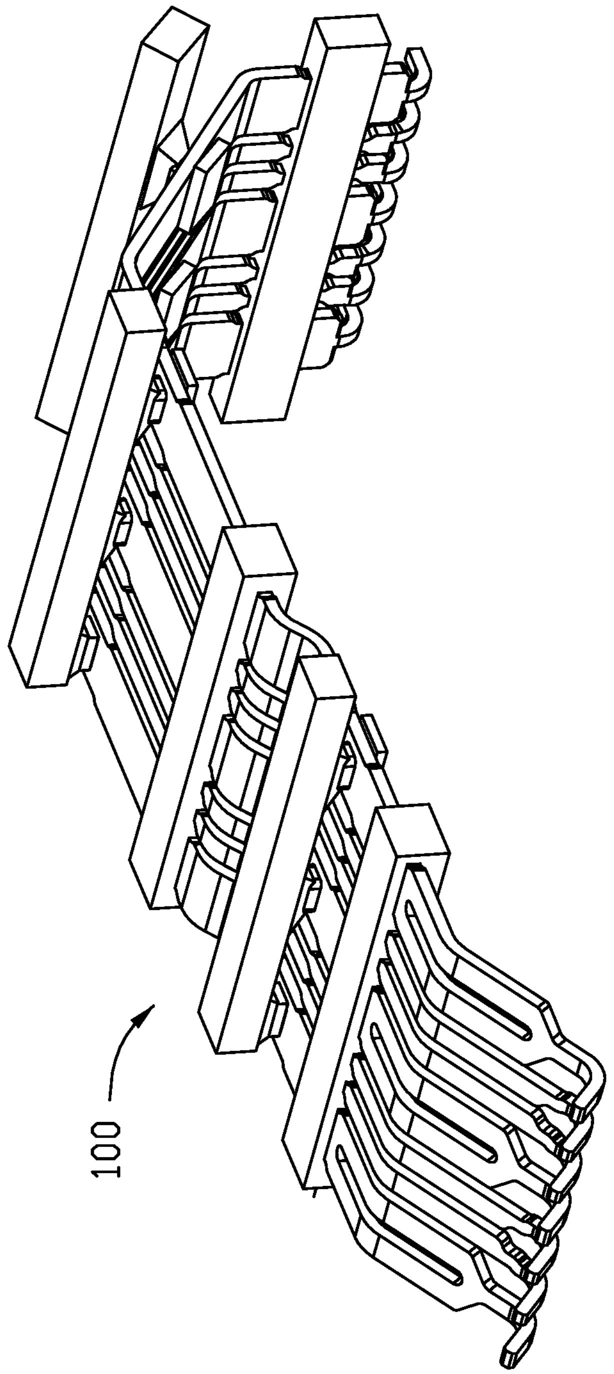
FIG. 1 is a perspective view of a contact assembly in accordance with the present invention.
Figure 2:
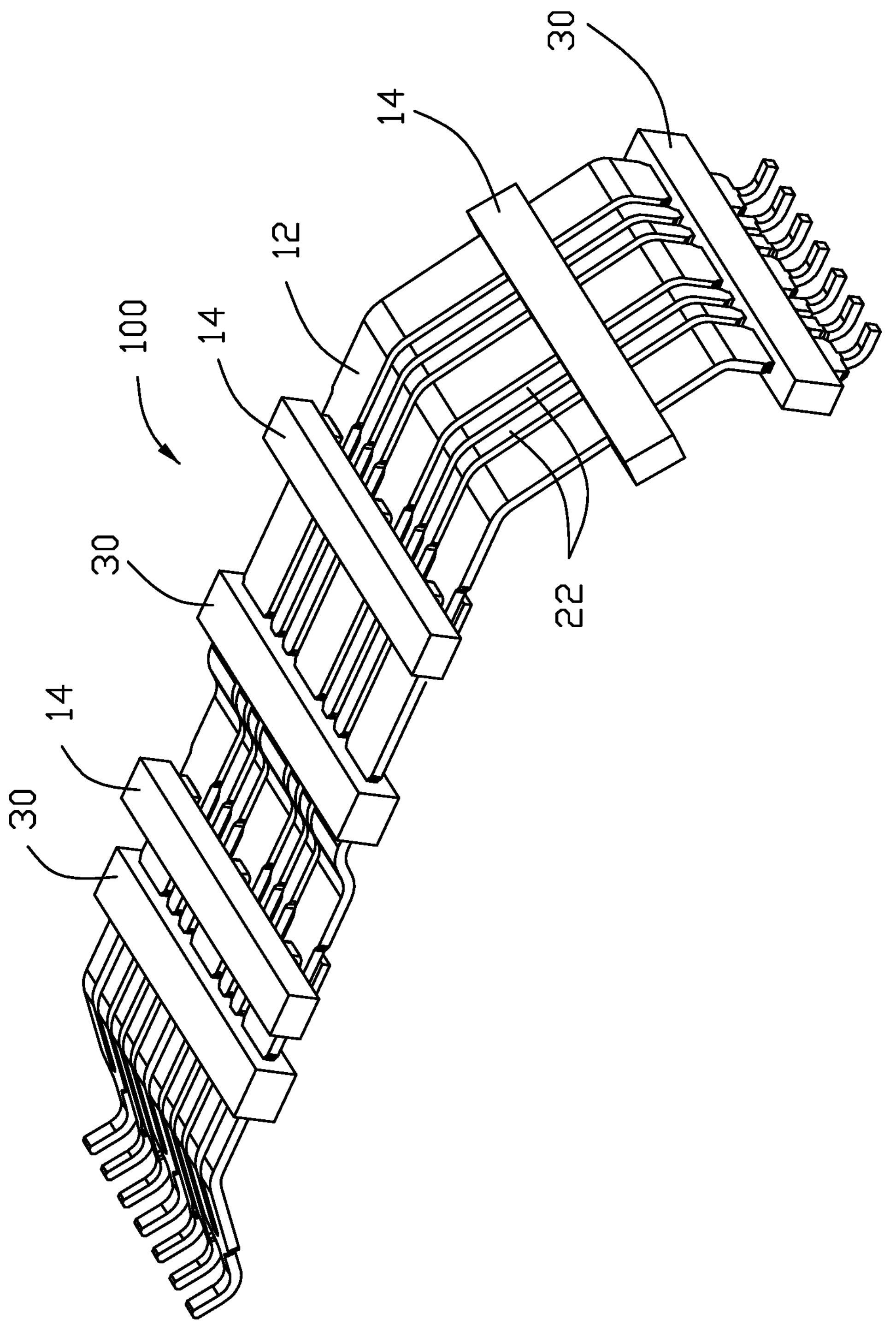
FIG. 2 is a view similar to FIG. 1 but from another perspective.
Figure 3:
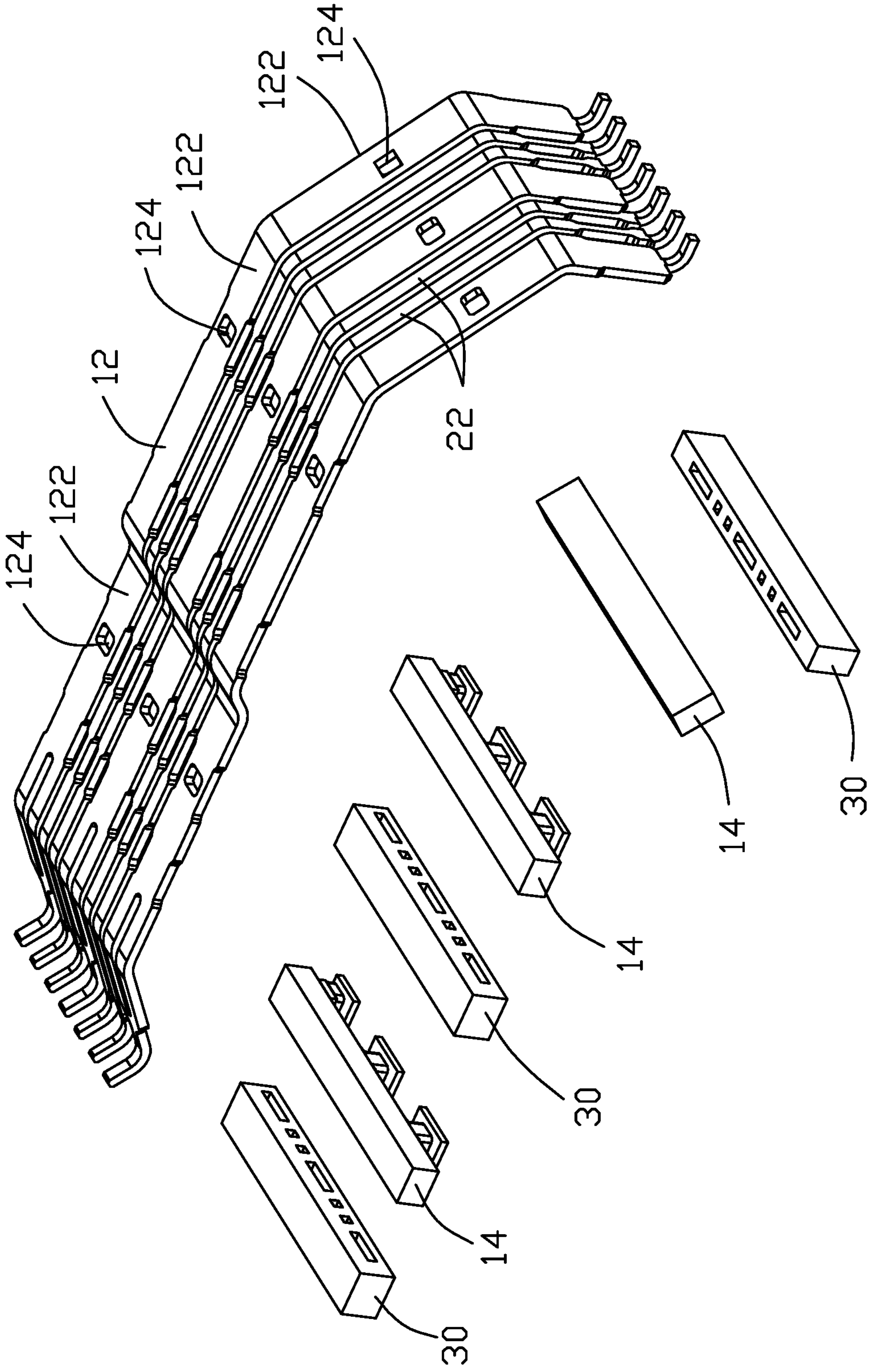
FIG. 3 is an exploded view of the contact assembly in FIG. 2.
Figure 4:
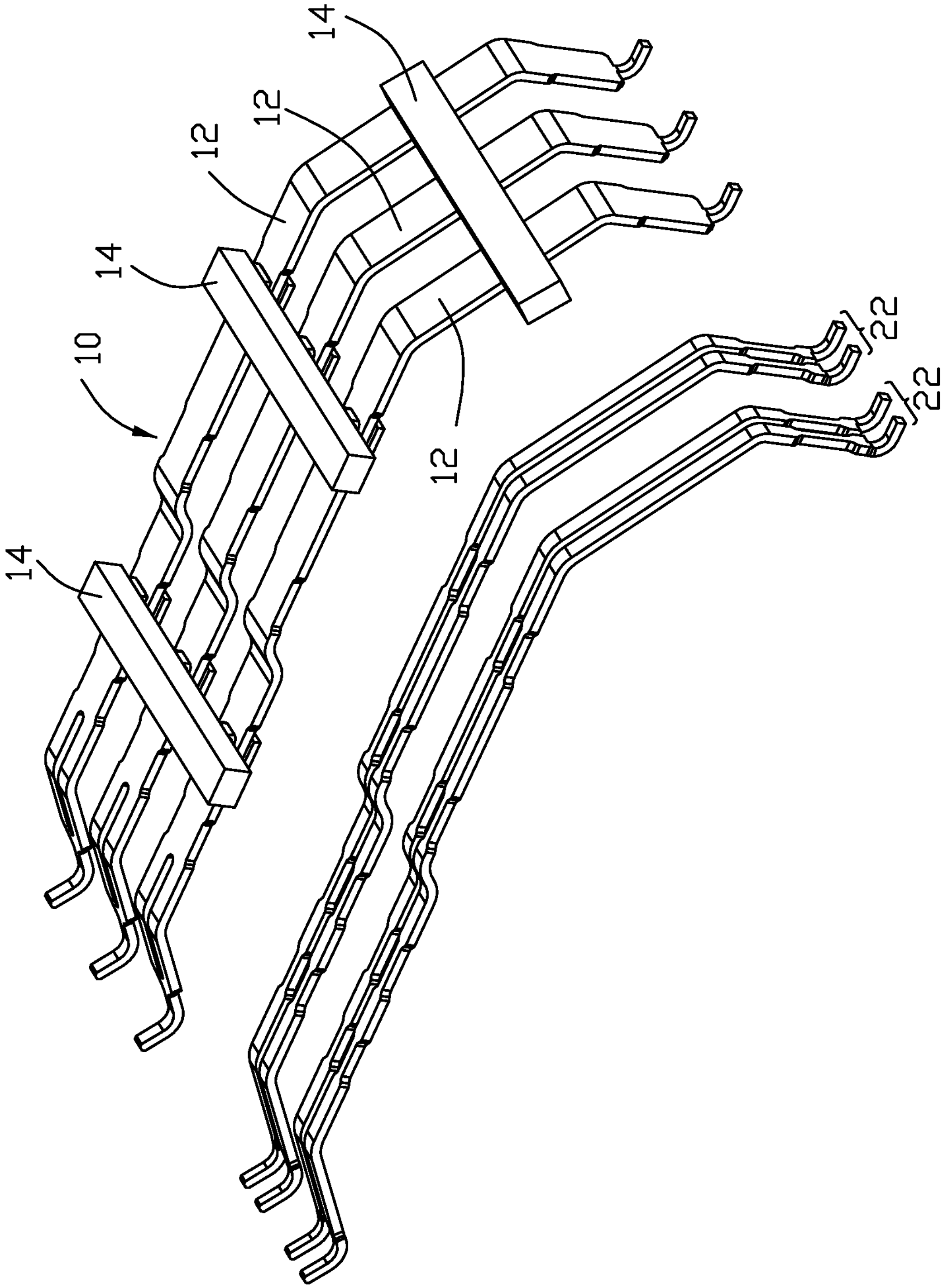
FIG. 4 is another exploded view of the contact assembly in FIG. 2.

Referring to FIGS. 1-5, a contact assembly 100 for an electrical connector comprises: a ground contact module 10 including a plurality of ground contacts 12 defining one or more engaging sections 122 exposed to air and one or more electrically lossy members mounted to respective engaging sections 122 and extending through each of the plurality of ground contacts 12, a plurality of ground contacts 12 are being arranged in the lateral direction; plural pairs of signal contacts 22 alternately arranged between the plurality of ground contacts 12; and one or more insulative members 30 mounted to the plural pairs of signal contacts 22 and at least some of the plurality of ground contacts 12. The electrically lossy member may be a conductive plastic member 14 made of conductive plastic, and mounted to the respective engaging sections 122, in order to mechanically and electrically connect the ground contacts 16 together, but not electrically connecting the signal contacts 22. The insulative members 30 are integrally formed on the plurality of pairs of signal contacts 22 and the plurality of ground contacts 12. The electrical connector to which the contact assembly 100 may be applied is generally of a known design and may be an electrical receptacle mounted onto a host board and include an insulative housing receiving one or more such contact assemblies, such as a receptacle connector disclosed in U.S. Pat. No. 10,367,308, or it may suitably be a plug connector or a receptacle connector connected to a cable.

Figure 5:
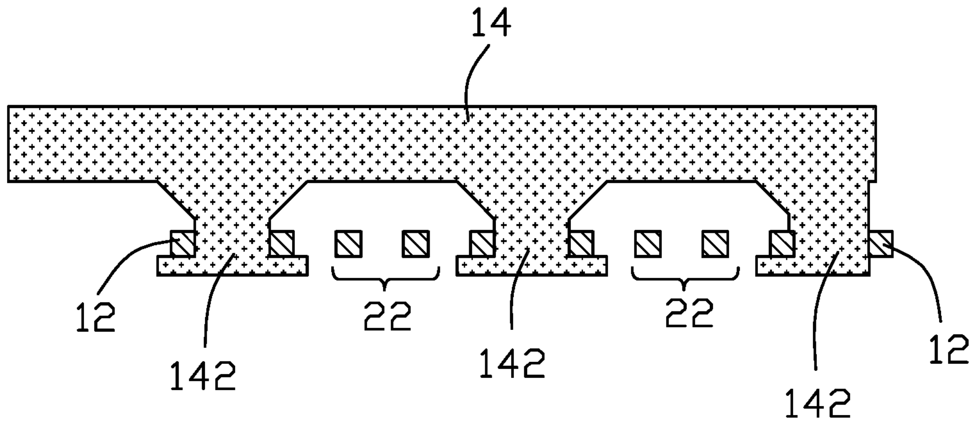
FIG. 5 is a cross-sectional view taken along a conductive plastic member of the contact assembly in FIG. 2.

The ground contact module 10 exhibits a ground contact lead-frame with discrete conductive plastic members 14. The ground contact 12 has a front contacting portion, a rear tail, and an intermediate portion and is stamped with features, such as one or more holes 124 at the intermediate portion. The conductive plastic member 14 has a plurality of posts 142 extending through the holes 124 and heat staked to the engaging sections 122 of the ground contacts 12. The conductive plastic members 14 is adhered to two or more sides of the ground terminal 12. After the posts 142 is heat staked to the engaging sections 122, the size of the end of the posts 142 is larger than the width of the ground contact 12. In this construction, there is single material (i.e., the conductive plastic member 14) with air above the ground contact 12, as shown in FIG. 5. In contrast, in prior art designs, there is insulative plastic material under a conductive plastic member. So FIG. 5 clearly shows that the conductive plastic member 14 is located independently of the insulative member 30. The conductive plastic members 14 are arranged alternately with the insulative members 30 along the length of the contact. The post 142 may have features to control insertion depth. The conductive plastic member 14 may improve electrical characteristics, reduce crosstalk resonance peaks and facilitate the transmission of high-speed signals The signal contact 22 also has a front contacting portion, a rear tail, and an intermediate portion. The signal contacts 22 may be separately stamped and then brought to the ground contact module 10 for subsequent molding of the insulative member 30. Or the signal contacts 22 may be stamped concurrently with the ground contacts 12 and then the conductive plastic member 14 is heat staked to the ground contacts 12 followed by molding of the insulative member 30 over the ground and signal contacts 12 and 22 (but not the conductive plastic member 14).

The invention claimed is:

1. A contact assembly for an electrical connector, comprising:

a ground contact module including a plurality of ground contacts defining an engaging section exposed to air and a conductive plastic member mounted to the engaging section and extending through each of the plurality of ground contacts;

plural pairs of signal contacts alternately arranged between the plurality of ground contacts; and an insulative member mounted to the plural pairs of signal contacts and at least some of the plurality of ground contacts; wherein the conductive plastic member comprises a plurality of posts extending through and heat staked to the engaging section of the plurality of ground contacts.

2. The contact assembly as claimed in claim 1, wherein each of the ground contacts has a front contacting portion, a rear tail, and an intermediate portion and is stamped with one or more holes for a corresponding post to pass through the intermediate portion.

3. The contact assembly as claimed in claim 1, wherein the plurality of ground contacts define plural engaging sections exposed to air, and there are plural conductive plastic members each mounted to a corresponding engaging section.

4. The contact assembly as claimed in claim 1, wherein the conductive plastic member is located independently of the insulative member.

5. The contact assembly as claimed in claim 1, wherein the conductive plastic member comprises a plurality of posts and each post has a feature to control insertion depth.

6. The contact assembly as claimed in claim 1, wherein there is single material with air above the ground contact.

7. A method of making a contact assembly, comprising the steps of:

mounting an electrically lossy member to an engaging section of a plurality of ground contacts to expose the engaging section to air and to extend through each of the plurality of ground contacts to form a ground contact module;

arranging plural pairs of signal contacts alternately between the plurality of ground contacts; and molding an insulative member to the plural pairs of signal contacts and at least some of the plurality of ground contacts; wherein the step of arranging comprises separately stamping and bringing the plural pairs of signal contacts to the ground contact module for subsequent molding of the insulative member; and the step of arranging comprises stamping the plural pairs of signal contacts concurrently with the ground contacts and then heat staking the electrically lossy member to the ground contacts followed by molding of the insulative member over all the ground and signal contacts.

8. A contact assembly for an electrical connector, comprising:

a ground contact module including a plurality of ground contacts defining an engaging section exposed to air and a conductive plastic member mounted to the engaging section and extending through each of the plurality of ground contacts;

plural pairs of signal contacts alternately arranged between the plurality of ground contacts; and an insulative member mounted to the plural pairs of signal contacts and at least some of the plurality of ground contacts; wherein the conductive plastic member is located independently of the insulative member.

9. A contact assembly for an electrical connector, comprising:

a ground contact module including a plurality of ground contacts defining an engaging section exposed to air and a conductive plastic member mounted to the engaging section and extending through each of the plurality of ground contacts;

plural pairs of signal contacts alternately arranged between the plurality of ground contacts; and an insulative member mounted to the plural pairs of signal contacts and at least some of the plurality of ground contacts; wherein the conductive plastic member comprises a plurality of posts and each post has a feature to control insertion depth.

* * * * *